(12) United States Patent
Campbell

(10) Patent No.: US 6,385,712 B1
(45) Date of Patent: May 7, 2002

(54) METHOD AND APPARATUS FOR SEGREGATION OF VIRTUAL ADDRESS SPACE

(75) Inventor: Paul Campbell, Oakland, CA (US)

(73) Assignee: ATI International SRL (BB)

( * ) Notice: Subject to any disclaimer, the term of this patent is extended or adjusted under 35 U.S.C. 154(b) by 0 days.

(21) Appl. No.: 09/426,323

(22) Filed: Oct. 25, 1999

(51) Int. Cl.⁷ .............................................. G06F 12/10
(52) U.S. Cl. ..................................... 711/206; 711/207
(58) Field of Search ................................ 711/206, 207, 711/205, 202, 208, 209

(56) References Cited

U.S. PATENT DOCUMENTS

| | | | | |
|---|---|---|---|---|
| 4,004,278 A | * | 1/1977 | Nagashima ................. | 711/203 |
| 4,145,738 A | * | 3/1979 | Inoue et al. ................. | 711/209 |
| 4,785,392 A | * | 11/1988 | Maier et al. ................. | 712/227 |
| 5,123,101 A | * | 6/1992 | Sindhu ........................ | 711/207 |
| 5,129,071 A | * | 7/1992 | Yamagata et al. ........... | 709/100 |
| 5,230,045 A | * | 7/1993 | Sindhu ........................ | 711/203 |
| 5,815,686 A | * | 9/1998 | Earl et al. ...................... | 703/26 |
| 5,930,833 A | * | 7/1999 | Yoshioka et al. ............ | 711/141 |
| 5,953,520 A | * | 9/1999 | Mallick ........................ | 703/26 |
| 6,069,638 A | * | 5/2000 | Porterfield ................... | 711/202 |
| 6,092,172 A | * | 7/2000 | Nishimoto et al. .......... | 711/207 |
| 6,138,226 A | * | 10/2000 | Yoshioka et al. ............ | 711/118 |
| 6,189,074 B1 | * | 2/2001 | Pedneau ....................... | 711/139 |

\* cited by examiner

*Primary Examiner*—Hiep T. Nguyen
(74) *Attorney, Agent, or Firm*—Vedder, Price, Kaufman & Kammholz

(57) ABSTRACT

A method and apparatus for segregation of virtual address space in a computer system is provided. An embodiment of the invention provides compatibility of an emulated processor architecture with a native processor architecture. Address space for the emulated processor architecture is provided and segregated from other address space, such as address space designated for use by a native processor, where the native processor is the processor actually present in a computer system. An embodiment of the invention provides separate exception handlers to handle translation lookaside buffer (TLB) misses for each address space. An embodiment of the invention provides an address space tag associated with a virtual address to designate the address space to which that virtual address pertains.

23 Claims, 5 Drawing Sheets

METHOD AND APPARATUS FOR SEGREGATION OF VIRTUAL ADDRESS SPACE

TECHNICAL FIELD OF THE INVENTION

The invention relates generally to memory management in a computer system and more specifically to a method and apparatus for performing a memory access operation in a computer system.

BACKGROUND OF THE INVENTION

In a computer system, instructions and data are stored in a memory device until they are needed. The memory device is organized according to an addressing scheme to allow the instructions and data to be located by specifying an address. However, while the memory device is organized into a plurality of physical addresses, it is often useful for a processor to consider the instructions and data to be organized according to a different addressing scheme, denoted by virtual addresses. The virtual addresses may be converted to physical addresses to allow the instructions and data to be accessed in the memory device.

A translation lookaside buffer (TLB) structure may be used to provide a cache for translation of virtual addresses to physical addresses. The TLB structure includes a plurality of page directories that contain page directory entries and a plurality of page tables that contain page table entries. The page directory entries serve as pointers to the plurality of page tables and the page table entries serve as pointers to pages of data in the memory device.

FIG. 6 is a block diagram illustrating the relationship between a processor, a TLB structure, and memory. Processor 601 is coupled to and communicates in virtual addresses with TLB structure 602. TLB structure 602 is coupled to and communicates in physical addresses with memory device 603.

FIG. 1 is a flow diagram illustrating a prior art process for obtaining data from a TLB structure. In step 101, a page directory entry is read from a page directory. In step 102, a page table entry is read from a page table using the page directory entry. In step 103, data are read from a page in the memory device using the page table entry.

While a TLB structure is useful for caching virtual address-to-physical address translations, it is not readily compatible with a computer architecture that provides for the emulation of an emulated processor using a native processor. The native processor is the processor actually present in the system, while the emulated processor is a processor whose performance characteristics simulated by the native processor. The emulation allows execution on the native processor of software programmed to be executed on a processor of the same type as the emulated processor. However, software programmed to be executed on a processor of the same type as the emulated processor is subject to the constraints and conditions associated with that type of processor. For example, the emulated processor architecture may already use all of its address space thereby causing incompatibility with certain bookkeeping techniques commonly used with prior art TLBs. Thus, a method and apparatus is needed to allow efficient memory accesses given the constraints imposed by an emulated processor architecture.

DETAILED DESCRIPTION OF A PREFERRED EMBODIMENT

Figure 1:
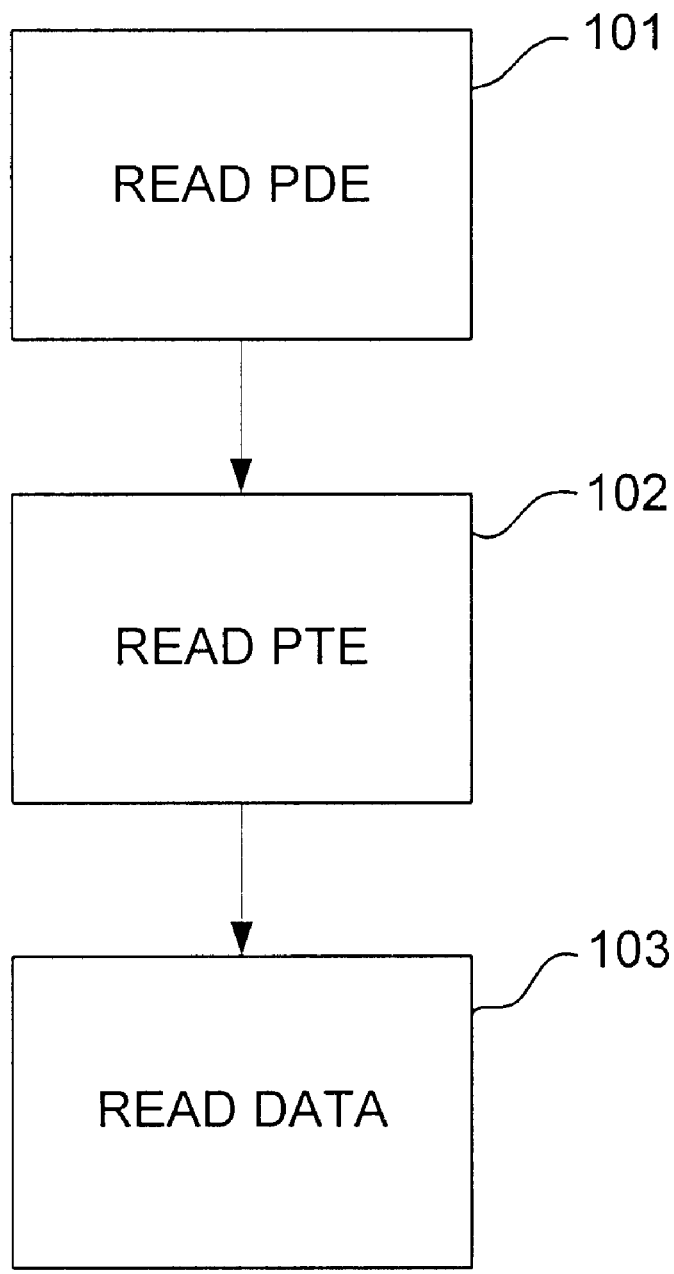
FIG. 1 is a flow diagram illustrating a prior art process for obtaining data from a translation lookaside buffer structure.

The invention provides a method and apparatus for segregation of virtual address space in a computer system. An embodiment of the invention provides compatibility of an emulated processor architecture with a native processor architecture. Address space for the emulated processor architecture is provided and segregated from other address space, such as address space designated for use by a native processor, where the native processor is the processor actually present in a computer system. An embodiment of the invention provides separate exception handlers to handle translation lookaside buffer (TLB) misses for each address space. An embodiment of the invention provides an address space tag associated with a virtual address to designate the address space to which that virtual address pertains.

An embodiment of the invention is useful in a computer that does load or store instructions or executes instruction code fetches where the resulting memory access has a virtual address. An address space for the memory access may be implicitly or explicitly provided. A TLB structure matches the address space and virtual address to produce a physical address or, if no entry is present, an exception. By providing an address space tied to a memory access instruction and the TLB structure that matches it, this embodiment of the invention provides advantages not heretofore realized.

Optionally, memory accesses for one or more address spaces may bypass the TLB structure. Thus, use of the TLB structure may be made dependent upon the address space specified for the memory access.

In accordance with an embodiment of the invention, each address space may generate its own unique exception (i.e., each address space may have its own exception handler). Thus, a different mechanism is provided to handle exceptions for each address space.

Optionally, one or more address spaces may be protected so that instructions that are not privileged operating system instructions cause an exception. Thus, intentional or accidental memory accesses to an improper memory space are prevented and handled by an exception handler.

An embodiment of the invention provides for the emulation of a traditional page table structure (e.g., that of an x86 processor architecture) some or all of the above-described features and software exception handlers. As an example, a first address space may be used to emulate a full (e.g., 32-bit) traditional address space mapped by page tables where accesses to a first address in the first address space that miss in the TLB structure jump to a first software exception handler.

The first software exception handler generates a second address in a second address space derived from the first address in the first address space that missed (i.e., could not be found) in the TLB structure and attempts to read a page table entry from the second address in the second address space. In attempting to read a page table entry from the second address in the second address space, one of two things may occur. One possibility is that the second address in the second address space matches a translation lookaside buffer structure entry. If so, a page table entry is read from memory and placed in the TLB structure mapping the first address from the first address space to the page table entry. A second possibility is that the second address in the second address space doesn't match the TLB structure entry and the processor jumps to a second software exception handler.

In the latter case, the second software exception handler generates a third address in a third address space derived from the second address in the second address space that missed in the TLB structure and attempts to read a page table entry from the third address in the third address space. The attempt to read the page table entry from the third address in the third address space does not require reference to the TLB structure (i.e., the TLB structure is bypassed).

From the third address in the third address space, a page table entry is read from a memory device and placed in the TLB structure, mapping the second address from the second address space to the page table entry.

After a page table entry is read from memory and placed in the TLB structure mapping the first address from the first address space to the page table entry in accordance with the first possibility discussed above, then the access to the first address in the first address space is tried again and succeeds.

After a page table entry is read from a memory device and placed in the TLB structure mapping the second address from the second address space to the page table entry in accordance with the second possibility discussed above, then the access to the second address in the second address space is tried again and succeeds. Then a page table entry is read from memory and placed in the TLB structure, mapping the first address from the first address space to the page table entry. Then the access to the first address space is tried again and succeeds.

Figure 2:
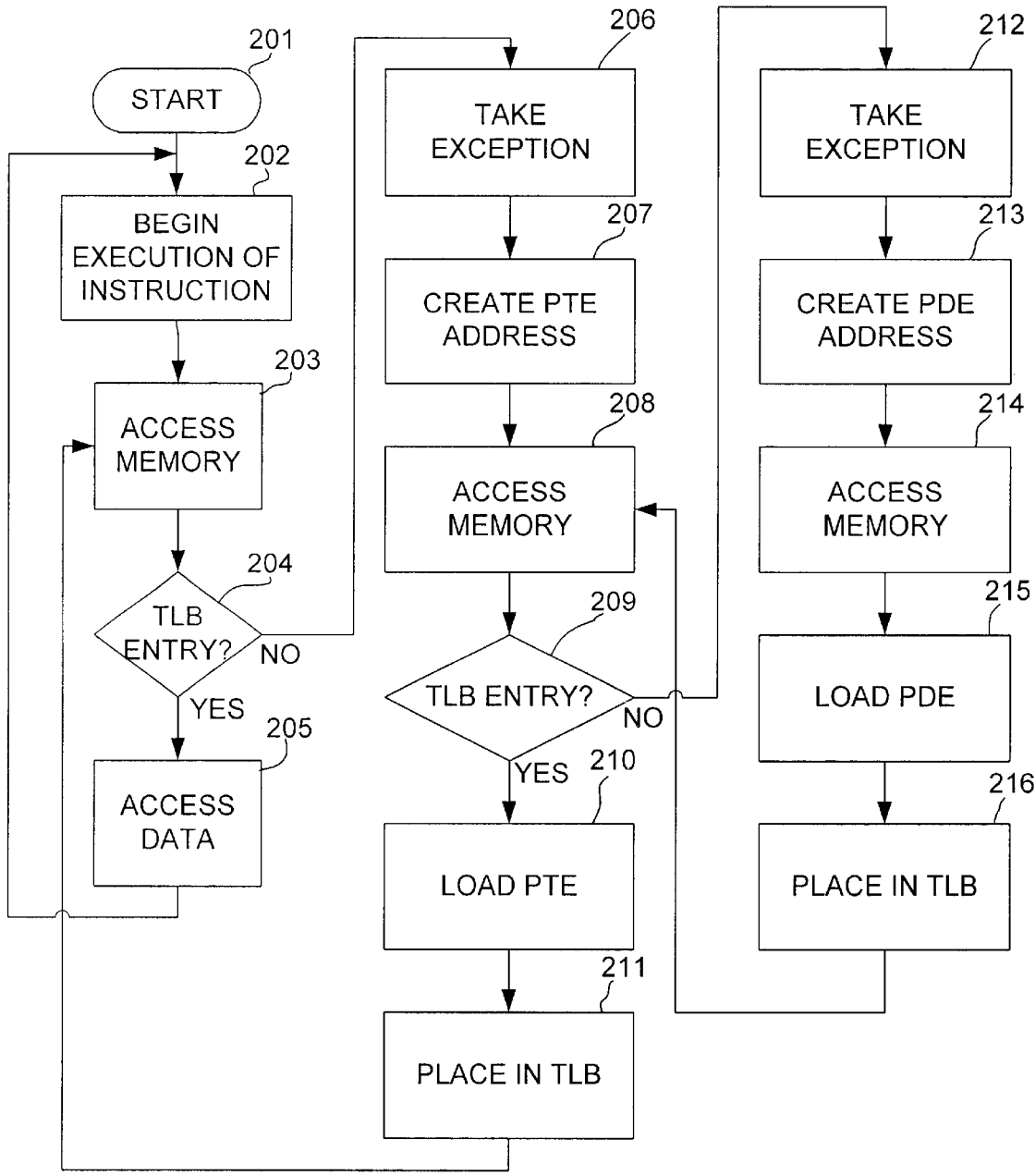
FIG. 2 is a flow diagram illustrating a process for obtaining data from a translation lookaside buffer structure according to an embodiment of the invention.

FIG. 2 is a flow diagram illustrating a process for obtaining data from a translation lookaside buffer structure according to an embodiment of the invention. The process begins in step 201. In step 202, the execution of an instruction involving a memory access operation begins. In step 203, the memory access operation begins. A first virtual address and a first address space are generated. In step 204, the TLB structure is checked to determine if a TLB entry exists that matches the first virtual address and the first address space to produce a physical address in a memory device. If a TLB entry exists, the process continues in step 205. In step 205, the data access is performed and the data are obtained from the memory device using the physical address. Following the successful data access, the remainder of the instruction is executed using the data obtained from the memory device and the process returns to step 202 to begin execution of another instruction.

If, in step 204, a TLB miss occurs (i.e., no matching TLB is found in the TLB structure), the process continues in step 206. In step 206, the processor generates an exception and executes a first exception handler. In step 207, a page table entry address is created identifying a second virtual address in a second address space. In step 208, a memory access operation begins based on the second virtual address and the second address space. In step 209, the TLB structure is checked to determine if a TLB entry exists that matches the second virtual address and the second address space to produce a physical address in the memory device. If a TLB entry exists, the process continues in step 210. In step 210, the page table entry identified by the page table entry address generated in step 207 is loaded from the memory device. In step 211, the page table entry is placed in the TLB structure to map the first virtual address and the first address space to the physical address of the location in the memory device, and the process returns to step 203. After step 203, since the TLB entry is then present in the TLB structure, the process will continue to step 205 from step 204, and the data will be successfully obtained from the memory device.

If, in step 209, a TLB miss occurs, the process continues in step 212. In step 212, the processor generates an exception and executes a second exception handler. In step 213, a page directory entry address is generated identifying a third virtual address and a third address space. In step 214, the memory device is accessed based on the third virtual address and the third address space. The TLB structure need not be consulted for this memory access. In step 215, the page directory entry specified according to step 213 is loaded from the memory device. In step 216, the page directory entry is placed in the TLB structure to map the second virtual address and the second address space to the physical address of the location in the memory device, and the process returns to step 208. After step 208, since the TLB entry is then present in the TLB structure, the process will continue to step 210 from step 209, and the page table entry will be successfully loaded from the memory device.

Figure 3:
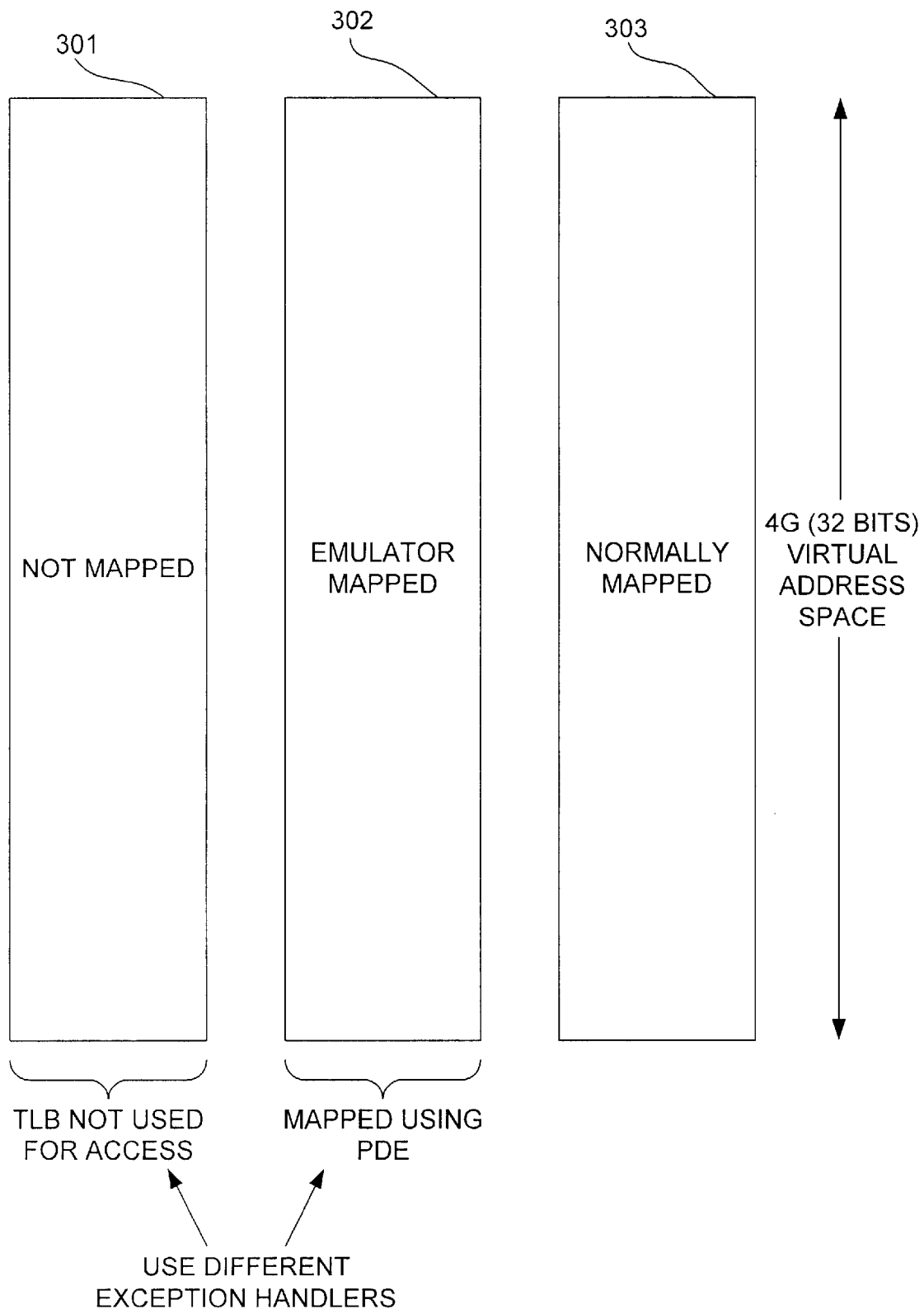
FIG. 3 is a block diagram illustrating a memory map according to an embodiment of the invention.

FIG. 3 is a block diagram illustrating a memory map according to an embodiment of the invention. In one example, the memory map provides multiple address spaces, each spanning four gigabytes ($2^{32}$ bytes) of virtual address space, based on the use of a 32-bit addressing scheme with an address space tag. Within the multiple address spaces, address space 303 is designated as normally-mapped address space. This address space may be used to implement the memory space normally used by a processor of the same type as the emulated processor.

Address space 302 is designated as emulator-mapped address space. This address space may be used to implement memory space for software executed by the native processor to control emulation of the emulated processor. This address space may be mapped using a page directory entry. According to one embodiment of the invention, different exception handlers are used to handle exceptions in address space 302 and address space 303.

Address space 301 is designated as purely physically-mapped address space. The TLB structure need not be used for memory accesses to this address space. Thus, the TLB need not map virtual addresses to this address space.

Additionally, other address space may be defined, with segregation provided between it and existing address spaces. For example, page table entry address space may be defined to allow page tables to be virtually contiguous (i.e., contiguous within the page table entry address space). A separate exception handler may be provided to map virtual addresses within the page table entry address space.

Figure 4:
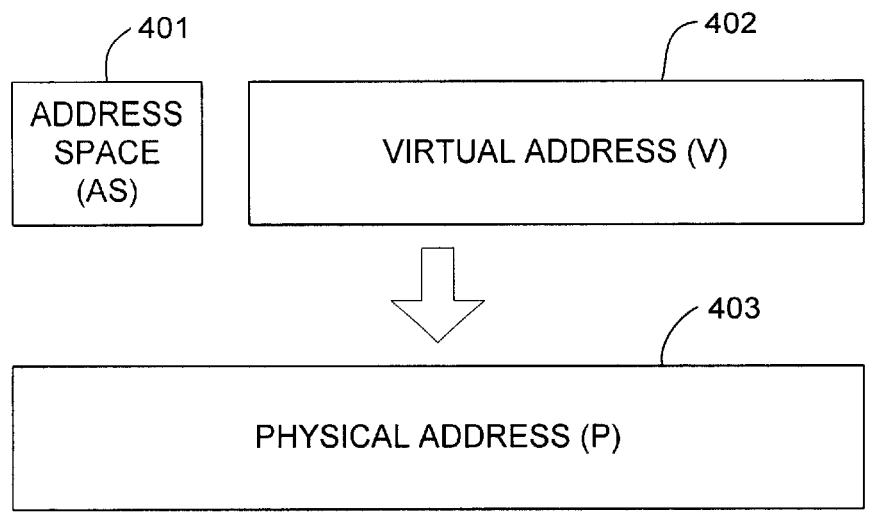
FIG. 4 is a block diagram illustrating a virtual address with an address space tag according to an embodiment of the invention.

FIG. 4 is a block diagram illustrating a virtual address with an address space tag according to an embodiment of the invention. While the desired address space may be identified in a memory access operation using a variety of techniques to specify, either implicitly or explicitly, which virtual address space should be used, one technique involves the use of an address space tag 401 associated with a virtual address 402. Physical address 403 may be identified based on virtual address 402 and address space tag 401. Unlike prior art schemes, address space tag 401 is not used to associate a virtual address with a particular process. Rather, address space tag 401 according to an embodiment of the invention allows differentiation between native processor address space, emulated processor address space, page table entry address space, unmapped address space, and any other address space that may be defined. Advantageously, this makes it possible to ensure that an emulated processor environment is provided with a similar configuration of address space as that provided for a processor of the same type as the emulated processor while still providing separate address space of the native processor and for other memory management uses.

Figure 5:
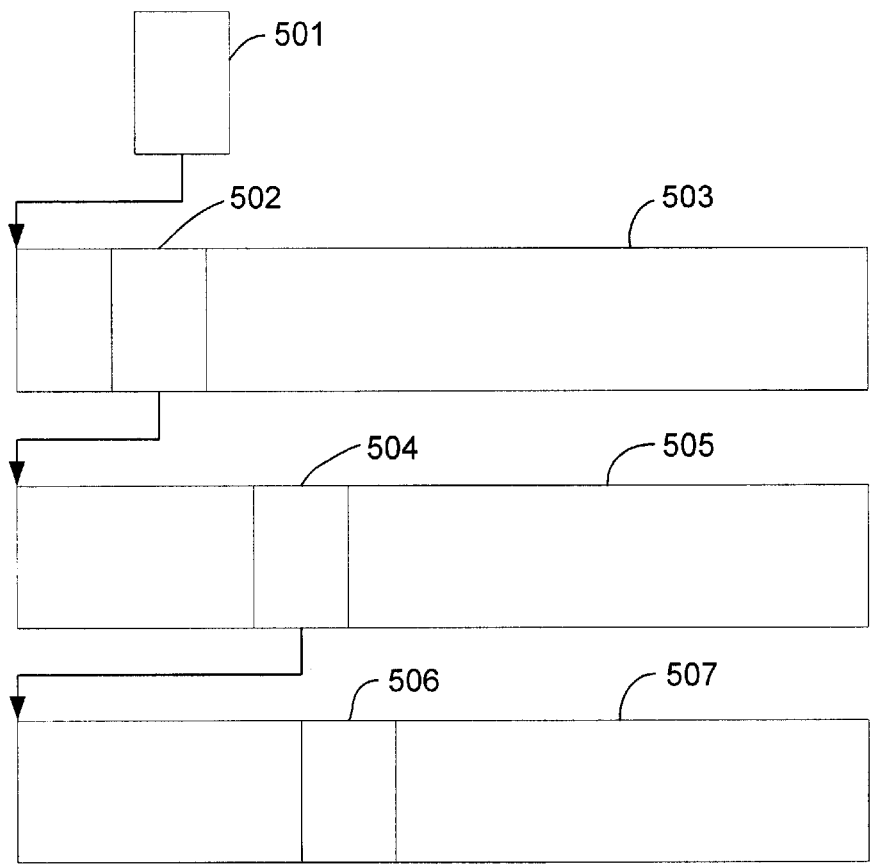
FIG. 5 is a block diagram illustrating a translation lookaside buffer structure for using an address space tag according to an embodiment of the invention.
Figure 6:
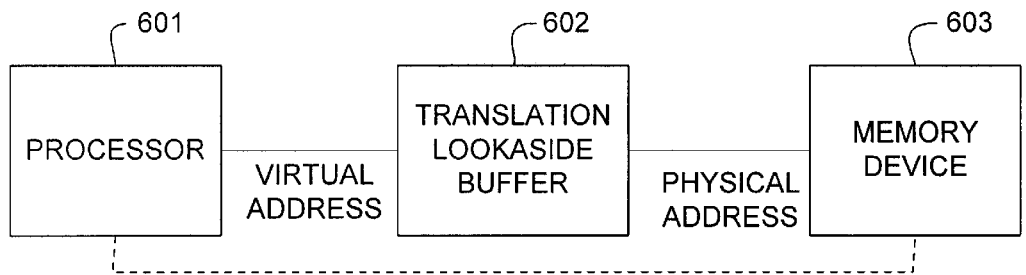
FIG. 6 is a block diagram illustrating the relationship between a processor, a translation lookaside buffer structure, and memory.

FIG. 5 is a block diagram illustrating a translation lookaside buffer structure for using an address space tag according to an embodiment of the invention. Combined address space tag and virtual address 501 identifies page directory entry 502 in page directory 503. Page directory entry 502 identifies page table entry 504 in page table 505. Page table entry 504 identifies data 506 in page 507. According to an embodiment of the invention, page directory 503 is defined within one address space, identified by a unique value of address space tag 401, page table 505 is defined within another address space, identified by a different value of address space tag 401, and page 507 is defined within yet another address space, identified by yet another value of address space tag 401.

Figure 7:
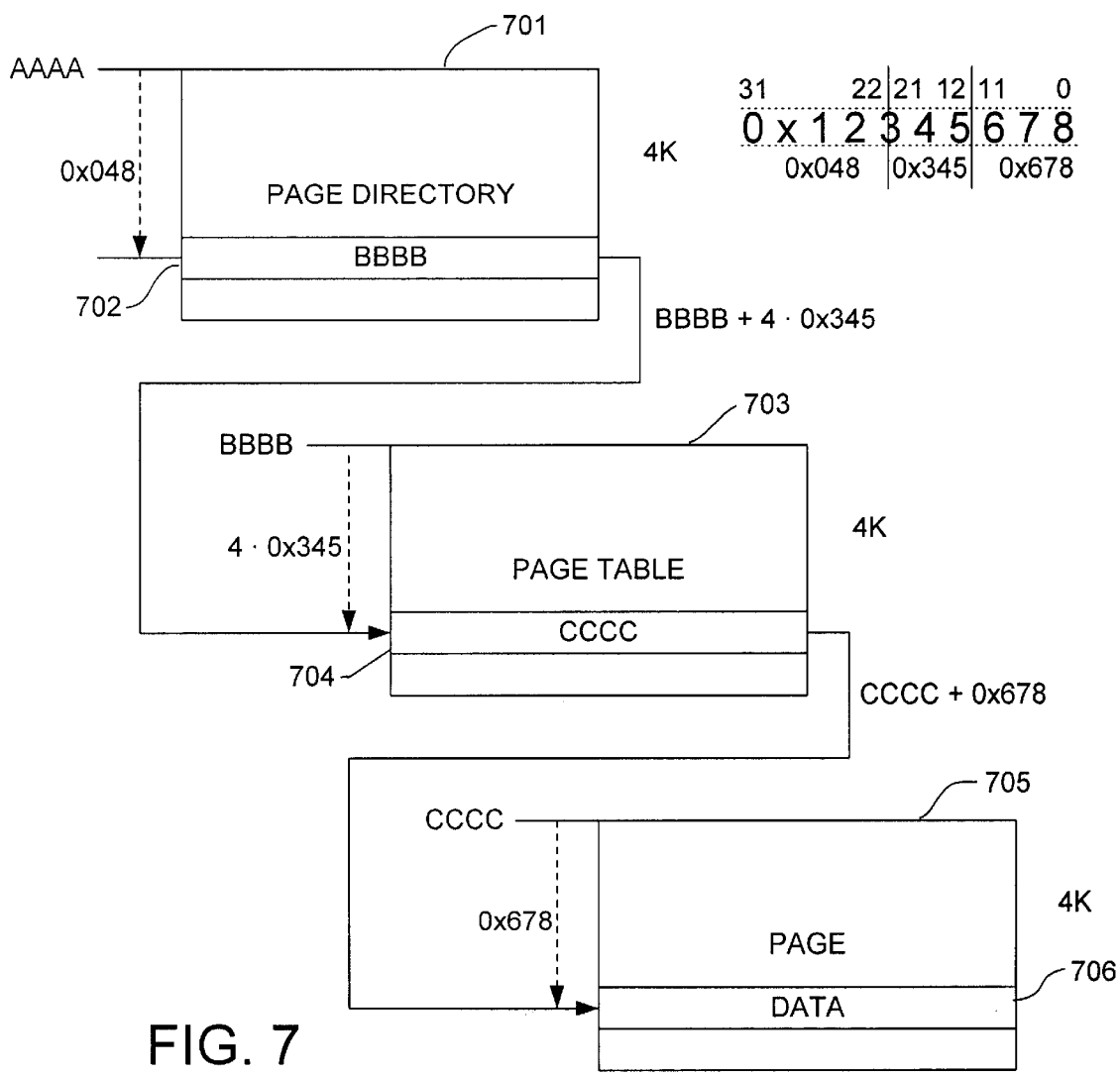
FIG. 7 is a block diagram illustrating an example of a translation lookaside buffer structure.

FIG. 7 is a block diagram illustrating an example of a translation lookaside buffer structure. The example shows the use of a TLB structure for accessing a cached translation of the 32-bit virtual address represented in hexadecimal as 0x12345678. The virtual address is divided into three parts. The first part comprises the most significant ten bits (bits 22–31). Since ten bits is not divisible into an integer number of hexadecimal digits, the boundaries between the hexadecimal digits change, giving the hexadecimal representation 0x048. The second part comprises ten bits (bits 12–21) of lesser significance than the ten most significant bits, but contiguous with the ten most significant bits. While these ten bits are also not divisible into an integer number of hexadecimal digits, since only the two most significant bits are truncated from the most significant hexadecimal digit of the second part, the hexadecimal representation of the second part remains 0x345. The third part comprises the twelve least significant bits (bits 0–11). Since these twelve bits are divisible into three hexadecimal digits, the hexadecimal representation for these twelve bits remains 0x678.

Page directory 701 begins at address AAAA. Applying the first part of the virtual address, denoted as 0x048, as an offset within page directory 701 yields an address AAAA+0x048 containing value BBBB. Value BBBB identifies the beginning of page table 703. Applying four times the second part of the virtual address (i.e., the second part of the virtual address shifted to the left twice), denoted as 4·0x345, as an offset within page table 703 yields address BBBB+4·0x345 containing value CCCC. Value CCCC identifies the beginning of page 705. Applying the third part of the virtual address, denoted as 0x678, as an offset within page 705 yields address CCCC+0x678 containing data 706. Data 706 is the data stored at the physical address in the memory device that corresponds to the virtual address 0x12345678. Thus, the TLB structure provides caching of virtual address-to-physical address translations.

Thus, a method and apparatus for segregation of virtual address space in a computer system capable of providing compatibility of an emulated processor architecture with a native processor architecture has been provided.

What is claimed is:

1. A method for performing a memory access operation in a computer system, comprising the steps of:

executing a memory access instruction, the memory instruction comprising a first virtual address and a first address space tag;

using a translation lookaside buffer structure to match the first address space tag and the first virtual address to produce a first physical address;

generating a first exception if the first virtual address and first address space tag does not match an entry in the translation lookaside buffer;

processing the first exception using a first exception handler;

generating a second virtual address in a second address space derived from the first virtual address in the first address space that did not match an entry in the translation lookaside buffer structure; and attempting to read a page table entry using the second virtual address in the second address space.

2. The method of claim 1 wherein the step of using a translation lookaside buffer structure to match the first address space tag and the first virtual address to produce the first physical address comprises the step of:

using the translation lookaside buffer structure to match the first address space tag and the first virtual address to produce the first physical address if an entry exists in the translation lookaside buffer structure for the first address space tag and the first virtual address.

3. The method of claim 1 wherein the step of generating the first exception if the entry does not exist in the translation lookaside buffer structure for the first address space tag and the first virtual address comprises the step of:

generating the first exception if the entry does not exist in the translation lookaside buffer structure for the first address space tag and the first virtual address, wherein the first exception is unique to the first address space, such that a different exception is generated for a different address space.

4. The method of claim 1, wherein the second virtual address is generated using the first exception handler.

5. The method of claim 1 further comprising the step of:

if the second virtual address in the second address space matches a second translation lookaside buffer entry, reading the page table entry from a memory device and placing the page table entry in the translation lookaside buffer structure so as to map the first virtual address in the first address space to the page table entry.

6. The method of claim 4 further comprising the step of:

successfully accessing the first virtual address in the first address space using the page table entry in the translation lookaside buffer structure.

7. The method of claim 1 further comprising the steps of:

if the second virtual address in the second address space misses in the translation lookaside buffer structure, generating a second exception;

generating, using a second exception handler different that the first exception handler, a third virtual address in a third address space derived from the second virtual address in the second address space that missed in the translation lookaside buffer structure; and attempting to read the page table entry using the third virtual address in the third address space.

8. The method of claim 7 wherein the step of attempting to read the page table entry from the third virtual address in the third address space comprises the step of:

attempting to read the page table entry using the third virtual address in the third address space without reference to the translation lookaside buffer structure.

9. The method of claim 7 further comprising the step of:

reading the page table entry from the memory device and placing the page table entry in the translation lookaside buffer structure so as to map the second virtual address from the second address space to the page table entry.

10. The method of claim 9 further comprising the step of:

successfully reading the page table entry using the second address from the second address space;

reading the page table entry from the memory device and placing the page table entry in the translation lookaside buffer structure so as to map the first virtual address in the first address space to the page table entry; and successfully accessing the first virtual address in the first address space using the page table entry in the translation lookaside buffer structure.

11. The method of claim 1 wherein the step of obtaining from the memory access instruction the virtual address, the memory access instruction denoting the address space specific to the memory access instruction further comprises the step of:

obtaining from the memory access instruction the virtual address, the memory access instruction explicitly denoting the address space specific to the memory access instruction.

12. The method of claim 1 wherein the step of using the translation lookaside buffer structure to match the address space and the virtual address to produce the physical address comprises the step of:

determining, based on the address space, whether to use to the translation lookaside buffer structure to match the address space and the virtual address to produce the physical address or to bypass use of the translation lookaside buffer structure.

13. The method of claim 1 further comprising the step of:

if the first address space is a protected address space, generating an exception if the memory access instruction is not a privileged operating system instruction.

14. A memory access apparatus comprising:

a memory device for storing a page table entry;

a translation lookaside buffer structure capable of storing the page table entry;

a processor for executing a first memory access instruction, the first memory access instruction comprising a first virtual address and a first address space tag, the first address space tag designating address space to which the first virtual address pertains, the processor coupled to the memory device and to the translation lookaside buffer structure, wherein the processor executing the first memory access instruction specifies attempts to match the first address space and the first virtual address to provide a physical address representing a location in the memory device; and when the translation lookaside buffer is unsuccessful in attempting to provide the physical address, the processor calls a first exception handler, and the first exception handler generates a second virtual address in a second address space derived from the first virtual address in the first address space, and the translation lookaside buffer structure is used to attempt to match the second address space and the second virtual address and to read a page table entry from the memory device to provide a physical address representing a location in the memory device.

15. The memory access apparatus of claim 14 wherein the processor identifies the first address space based on the first memory access instruction.

16. The memory access apparatus of claim 14 wherein the processor identifies the first address space based on a specific reference to the first address space tag.

17. The memory access apparatus of claim 14 wherein the processor generates an exception if, when the translation lookaside buffer attempts to provide the physical address, the translation lookaside buffer does not provide the physical address.

18. The memory access apparatus of claim 17 wherein the processor generates a different exception for a different address space.

19. The memory access apparatus of claim 14 wherein the processor executing a second memory access instruction specifies a second virtual address and a second address space and obtains a second physical address representing a second location in the memory device without obtaining the second physical address from the translation lookaside buffer.

20. The memory access apparatus of claim 14 where the first address space is protected such that the processor generates an exception unless the first memory access instruction is a privileged operating system memory access instruction.

21. The memory access apparatus of claim 16 wherein, if the second virtual address in the second address space is matched using the translation lookaside buffer structure, the page table entry is read from the memory device and placed in the translation lookaside buffer structure so as to map the first address from the first address space to the page table entry.

22. The memory access apparatus of claim 21 wherein, if the second virtual address in the second address space is not matched using the translation lookaside buffer structure, the processor generates a second exception.

23. The memory access apparatus of claim 22 wherein the processor calls a second exception handler different than the first exception handler, and the second exception handler generates a third virtual address in a third address space derived from the second virtual address in the second address space, and the page table entry is read from the memory device and placed in the translation lookaside buffer structure to map the second virtual address from the second address space to the page table entry.

* * * * *